Patented July 12, 1932

1,867,009

UNITED STATES PATENT OFFICE

GEORGE EDWARD HEYL, OF WESTMINSTER, LONDON, ENGLAND, ASSIGNOR TO MORRIS GREENHILL, OF LONDON, ENGLAND

MANUFACTURE OF NONSPLINTERING GLASS SHEETS

No Drawing. Original application filed September 18, 1928, Serial No. 306,750, and in Great Britain August 8, 1928. Divided and this application filed August 30, 1930. Serial No. 479,091.

This invention relates to an improved process for effecting the interadherence of two sheets of glass and an interposed sheet of cellulose derivative composition, such as cellulose acetate, in the manufacture of nonsplintering glass sheets, and originally formed part of the subject-matter disclosed in the specification of my co-pending application Serial No. 306,750 filed September 18, 1928.

The process consists in rendering adhesive the surfaces of the sheet of cellulose derivative composition by moistening such sheet with a liquid softener of the cellulose derivative composition, interposing the cellulose derivative sheet between two sheets of glass, subjecting the assembled sheets conjointly to laterally displaced mechanical pressure to squeeze out excess liquid and bed the sheets closely together, and finally exposing the assembled sheets directly in steam under pressure.

The sheets can be applied to one another whilst immersed in the softening liquid.

The laterally displaced mechanical pressure can be applied to the assembled pack of sheets after removal from the liquid in which they have been immersed, by passing the pack of sheets between squeezing rollers, which squeezes out any excess liquid besides bringing the glass sheets into intimate contact with the cellulose derivative composition sheet.

The cellulose derivative composition is preferably cellulose acetate, and the liquid softener which is employed therewith conveniently is triacetin.

The assembled pack of sheets can be subjected to the steam in an autoclave.

The sheets can be caused to interadhere by exposing the pack of sheets for fifteen to twenty-five minutes directly in steam at low pressure.

It is obvious that by employing a softening liquid such as triacetin, which has a high boiling point, there can be no development between the sheets, which are wet and already rolled into close contact, of vapor tending to separate them, and therefore there can be no tendency for the steam to enter between the sheets. It may however be found to be advisable to coat the edges of the sheet with sulphurized india rubber solution to delay contact of the steam with the actual exposed edge of the cellulose acetate sheet until hardened by absorption of the triacetin under the temperature of the steam.

I claim:

1. A process for effecting the interadherence of two sheets of glass and an interposed sheet of cellulose derivative composition, consisting in moistening said cellulose derivative composition sheet with a high boiling point liquid softener of said cellulose derivative composition, bringing said glass sheets into close surface contact with said moistened cellulose derivative sheet, and wholly exposing said closely contacting sheets directly in steam under pressure.

2. A process for effecting the interadherence of two sheets of glass and an interposed sheet of cellulose acetate, consisting in moistening said cellulose acetate sheet in triacetin, bringing said glass sheets into close surface contact with said moistened cellulose acetate sheet, and wholly exposing said closely contacting sheets directly in steam under pressure.

In testimony whereof I have signed my name to this specification.

GEORGE EDWARD HEYL.